June 12, 1962     J. CURRANT ET AL     3,038,823

METHODS OF APPLYING VISCOUS FLUIDS TO SURFACES

Filed Oct. 8, 1958

INVENTORS
JACK CURRANT
JOHN J. R. GENT
DONALD N. HUNTER

BY
Watson, Cole, Grindle & Watson
ATTORNEY 3,038,823
METHODS OF APPLYING VISCOUS FLUIDS TO SURFACES
Jack Currant, John Joseph Robert Gent, and Donald N. Hunter, London, England, assignors to D. Napier & Son Limited, London, England, a company of Great Britain
Filed Oct. 8, 1958, Ser. No. 766,030
Claims priority, application Great Britain Oct. 11, 1957
9 Claims. (Cl. 117—227)

This invention relates to methods of applying and spreading viscous fluids on a surface, particularly when it is required to obtain a thin substantially uniform film on the surface. The invention is of particular advantage where the fluid has such high viscosity that it cannot readily be applied by any normal methods such as by brushing or by spraying.

Now according to the present invention in a method of applying and spreading a viscous fluid on a surface, the fluid is applied to an upper part of a surface and the surface is vibrated. Thus preferably the fluid is allowed to descend over the surface under the effect of gravity while the surface is vibrated horizontally. The surface is preferably vibrated in a direction parallel to the general plane of the surface, and the vibrations are preferably imparted at a frequency of at least 20 and more conveniently at least 40 cycles per second.

According to a preferred feature of the invention heat is applied to the fluid and/or surface during the vibration. Thus the invention is particularly applicable to the application of a fluid film over an electrical surface heater element, in which case heater current is conveniently supplied to the heater element during the vibration of the surface.

The invention is particularly useful in spreading a viscous fluid consisting of a mixture of a synthetic resin in fluid form together with a high proportion of a powdered solid material, for example a metal powder. When the proportion of metal powder in the mixture is 80% or more by weight the viscosity of the mixture is too great for normal methods of application.

The flow of fluid over the surface may be assisted or controlled by directing a stream of gas against the fluid, and the gas stream may be warmed to further assist the flow.

Figure 1:
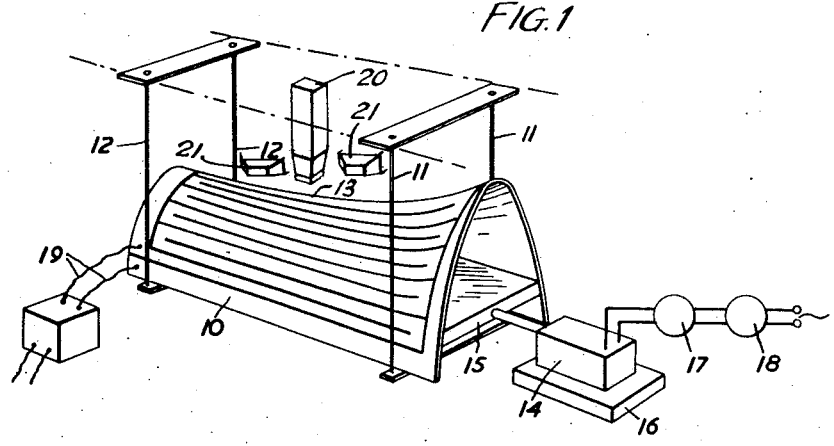
Figure 2:
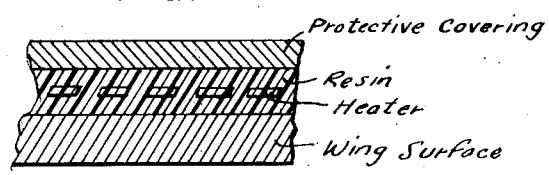

The invention may be performed in various different ways but one specific embodiment will now be described by way of example with reference to the accompanying drawing; FIGURE 1 is a diagrammatic perspective view of apparatus for applying a coating to an aircraft wing section and FIGURE 2 is a sectional elevational view in fragment of the article to be coated.

In this example the invention is applied to the provision of an outer protective surface layer covering an electrical surface heating element on the leading edge of an aircraft wing section 10. The surface heating element itself comprises a zig-zag pattern of a thin layer of aluminum alloy sandwiched between inner and outer insulating layers each formed of an epoxy resin adhesive such as a resin prepared by the reaction of epichlorohydrin and Bisphenol A (4,4'dihydroxydiphenylpropane). Particular forms of such heating elements are described and claimed in United States of America Patent No. 2,791,668.

In performing the present invention the outer insulating layer of the heater element is rubbed down with abrasive or sand blasted to provide a slight roughness and the complete wing is suspended on tension wires 11, 12 or mounted on flexible supports such as rubber cushions with the leading edge 13 of the wing uppermost and approximately horizontal.

An electrical vibrating device 14 is then attached to the wing at 15 with the body of the device connected to a stationary anchor 16 or to a heavy inertia mass. The device itself is conveniently in the form of a solenoid which when connected to an electrical supply will provide vibrations of the complete wing at a selected frequency and amplitude. The device 14 is connected to a frequency controller 17 and an amplitude controller 18 which enable the frequency and amplitude to be varied as required. In practice a frequency between 40 and 60 cycles per second is effective, though the frequency may be increased as high as 400 c./s. in some cases. The actual frequency will depend upon the article being treated, and will be adjusted to turn out unwanted natural vibrations. The amplitude may be between 2 and 10 thousandths of an inch. The position of the vibrating device 14 is such that the vibrations imparted to the wing will be in a horizontal direction parallel to the leading edge, and generally parallel to the parts of the wing surface on either side thereof. A gun 20 is employed to apply the coating and air jets 21 supply the heated air for drying the coating.

FIGURE 2 provides a cross section of the wing surface to be coated having suitable self-explanatory legends.

A mixture is prepared of the material which is to form the outer protective layer. In one example this mixture comprises 80% by weight of a 300 mesh (300 apertures per linear inch) silicon stainless steel powder (particle size below 70 microns), the particles being generally spherical, and 20% of the liquid epoxy resin prepared by the reaction of epichlorohydrin and Bisphenol A (4,4' dihydroxydiphenylpropane) under alkaline conditions and having an epoxide value of 5.0 equivalents per kilogramme. The proportions of metal powder may be increased with advantage up to 90% or even 93% by weight. The steel composition is 18% chromium, 8% nickel, 2% silicon, remainder iron. The hardness thereof is approximately 250 V.P.N. (equivalent to 22 Rockwell "C").

In another example the metal powder consists of an alloy containing 10-20% chromium, 2-3.5% boron, 2-3.5% silicon, up to 5% of other alloying elements such as iron, the remainder being nickel. This alloy has a hardness of between 35-62 Rockwell "C". Approximately the whole of the powder has a particle size between 10 and 70 microns, and a size distribution which is spread substantially evenly over the size range.

In the preparation of the mixture the liquid resin is heated to 100° C. and is agitated in a container with a submerged perforated paddle connected to an electrical vibrator giving vibrations of 25-50 thousandths of an inch at 50 c./s. The metal powder is preheated to 100 to 120° C. and is then added to the resin, which is agitated continuously and during the subsequent cooling down to less than 30° C. A hardener for the synthetic resin which is for example diethyl-amino-propylamine is then added in liquid form and mixed by hand. The complete mixture is then agitated for a further ten minutes to disperse any air entrapped.

The resultant mixture is a fluid of a very high viscosity which would normally be difficult to apply and spread at any controlled thickness over a surface. In accordance with the present invention the mixture is extruded through an extrusion gun along the uppermost part of the leading edge 13 of the wing and the vibrator 14 is energised to cause the wing to vibrate horizontally and in the general plane of the wing surface. The wing itself is heated by supplying heater current to the electrical surface heating element on the wing surface via flexible heater cables 19, and radiant heating may also be directed onto the external surfaces of the wing by electrical heat radiators positioned externally. In addition streams of warm air may be directed on to the viscous mixture by electrical warm air blowers. Under the influence of the vibrations and of the heat applied the viscous mixture will tend to spread and flow down both sides of the leading edge. A preferred thickness of the layer is .015 inch.

The area to be covered by the viscous mixture has previously been masked off with tape and when the lower edge of the mixture has moved on to the masking tape the vibrating device is shut off and also the supply of heat.

Within a short period of time the resin constituent of the mixture will have solidified and will be in the state known as the "B" condition, when it is solid but not fully cured. The masking tape is then removed and the edges of the applied layer are cut straight and faired in at a chamfer angle by applying a fillet of the mixture.

In some cases it is convenient to apply the mixture on a series of separate areas spaced by a small distance from one another and when this is done the gaps between the areas are now filled in with the same viscous metal-resin mixture using the same vibration and heating technique.

The whole applied surface layer is then fully cured by application of heat for the required time, usually by means of external radiators.

The surface of the curved layer is then subjected to an abrasive air blast to remove any small protuberances of resin which may have risen to the surface. If desired the surface can then be painted.

The resultant protective outer layer can thus be readily applied to surfaces of compound curvature and possesses remarkable properties of resistance to damage by small stones or similar particles. The vibration applied to the wing while the viscous mixture is spreading tends to eliminate any small air pockets which might otherwise form, and which would reduce the protective strength of the layer.

What we claim as our invention and desire to secure by Letters Patent is:

1. A method of applying and spreading a viscous fluid over an electric surface heater element on a surface, in which the fluid is applied to an upper part of the surface of the element and the element is vibrated and heater current is passed through the heater element during the vibration thereof.

2. A method as claimed in claim 1 in which the fluid is allowed to descend over the surface under the effect of gravity while the element is vibrated horizontally.

3. A method as claimed in claim 1 in which the element is vibrated in a direction parallel to the general plane of the surface on which the fluid lies.

4. A method as claimed in claim 1 in which the vibrations are imparted at a frequency of at least 40 cycles per second.

5. A method as claimed in claim 1 in which heat is applied to the fluid externally during the vibration.

6. A method as claimed in claim 1 in which the flow of the fluid over the surface is assisted or controlled by directing a stream of gas against the fluid.

7. A method as claimed in claim 6 in which the gas stream is warmed.

8. A method as claimed in claim 1 in which the viscous fluid comprises a mixture of a synthetic resin and a filler substance in the form of small particles of a solid material, the filler substance constituting at least 90% by weight of the total fluid composition.

9. A method as claimed in claim 8 in which the filler substance comprises a metal powder.

References Cited in the file of this patent

UNITED STATES PATENTS

| | | |
|---|---|---|
| 2,539,410 | Essig | Jan. 30, 1951 |
| 2,748,746 | Wommelsdorf | June 5, 1956 |
| 2,791,515 | Nack | May 7, 1957 |

FOREIGN PATENTS

| | | |
|---|---|---|
| 475,914 | Italy | Nov. 22, 1952 |
| 886,576 | Germany | Aug. 17, 1953 |
| 709,944 | Great Britain | June 2, 1954 |
| 319,253 | Switzerland | Mar. 30, 1957 |